United States Patent [19]

Baydar et al.

[11] Patent Number: 5,706,299

[45] Date of Patent: Jan. 6, 1998

[54] SONET TRIBUTARY AMBIGUITY RESOLUTION FOR ELASTIC STORE CONTROL

[75] Inventors: Ertugrul Baydar, Raleigh; William B. Weeber, Apex, both of N.C.

[73] Assignee: Alcatel Network Systems, Inc., Richardson, Tex.

[21] Appl. No.: 887,348

[22] Filed: May 21, 1992

[51] Int. Cl.⁶ ........................................... H04L 1/08
[52] U.S. Cl. ........................... 371/69.1; 371/67.1
[58] Field of Search ................... 371/69.1, 67.1, 371/57.1; 370/55, 58.1

[56] References Cited

U.S. PATENT DOCUMENTS

| | | | |
|---|---|---|---|
| 4,054,747 | 10/1977 | Pachynski, Jr. | 178/69.1 |
| 4,928,275 | 5/1990 | Moore et al. | 370/102 |
| 5,210,762 | 5/1993 | Weeber et al. | 371/69.1 |

FOREIGN PATENT DOCUMENTS

| | | |
|---|---|---|
| 0226017 | 6/1987 | European Pat. Off. |
| 9004294 | 4/1990 | WIPO |
| 9202999 | 2/1992 | WIPO |

OTHER PUBLICATIONS

"High Density Programmable FIFOs Add Design Flexibility", M. Shamshirian, *Wescon Conference Record*, Nov. 14–15, 1989, San Francisco CA, vol. 33, pp. 120–124.

"A 1.0um Compilable FIFO Buffer for Standard Cell", M. Kawauchi et al, *Proceedings of the IEEE 1989 Custom Integrated Circuits Conference*, San Diego CA, May 15–18, 1989, pp. 23.4.1–23.4.4.

*Primary Examiner*—Ly Hua
*Attorney, Agent, or Firm*—Ware, Fressola, Van Der Sluys & Adolphson LLP

[57] ABSTRACT

Read and write addresses on the local and line sides of a SONET elastic store are compared at least twice in order to determine any ambiguity in the comparison and, if so determined, foregoing any pointer adjustments that would otherwise have been made.

3 Claims, 5 Drawing Sheets

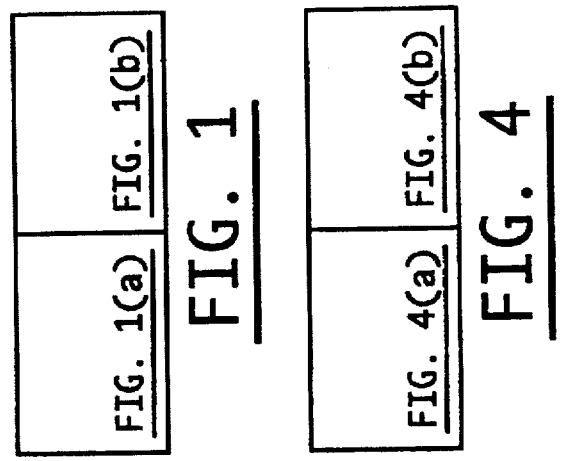
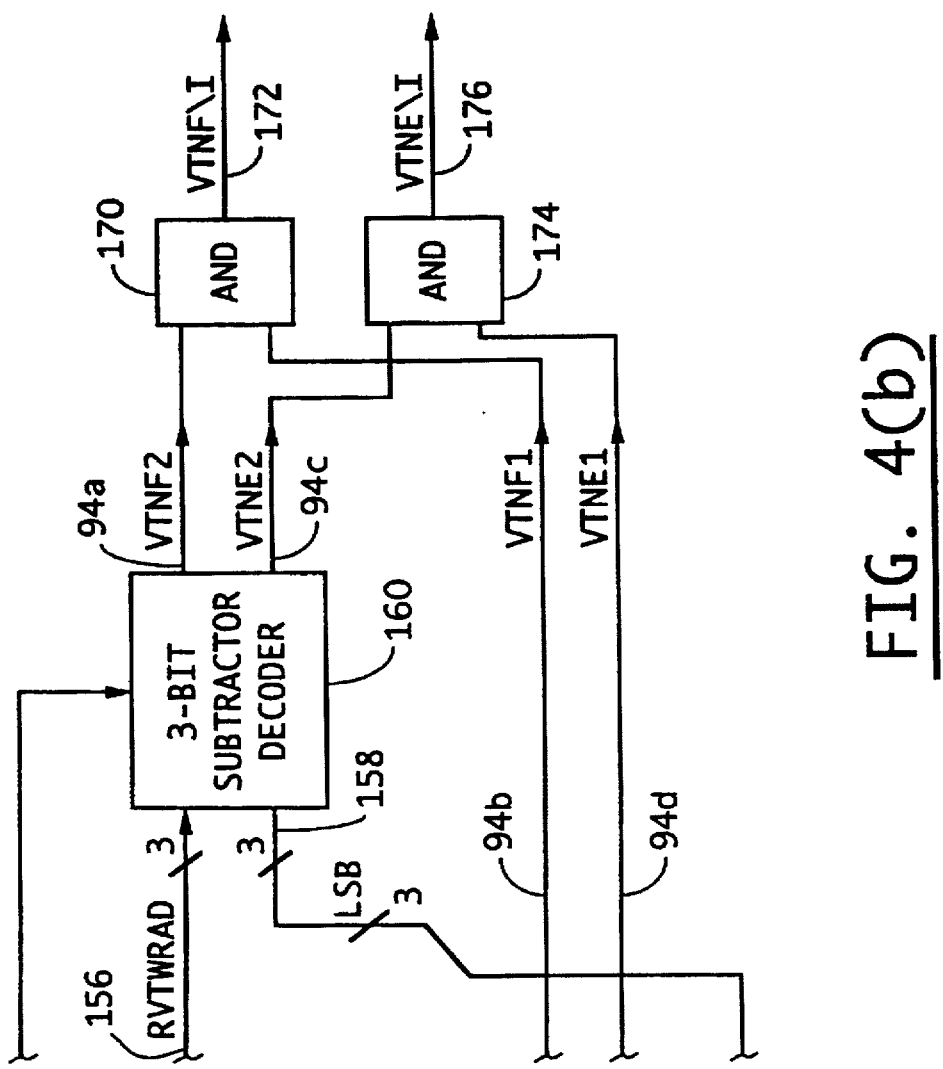

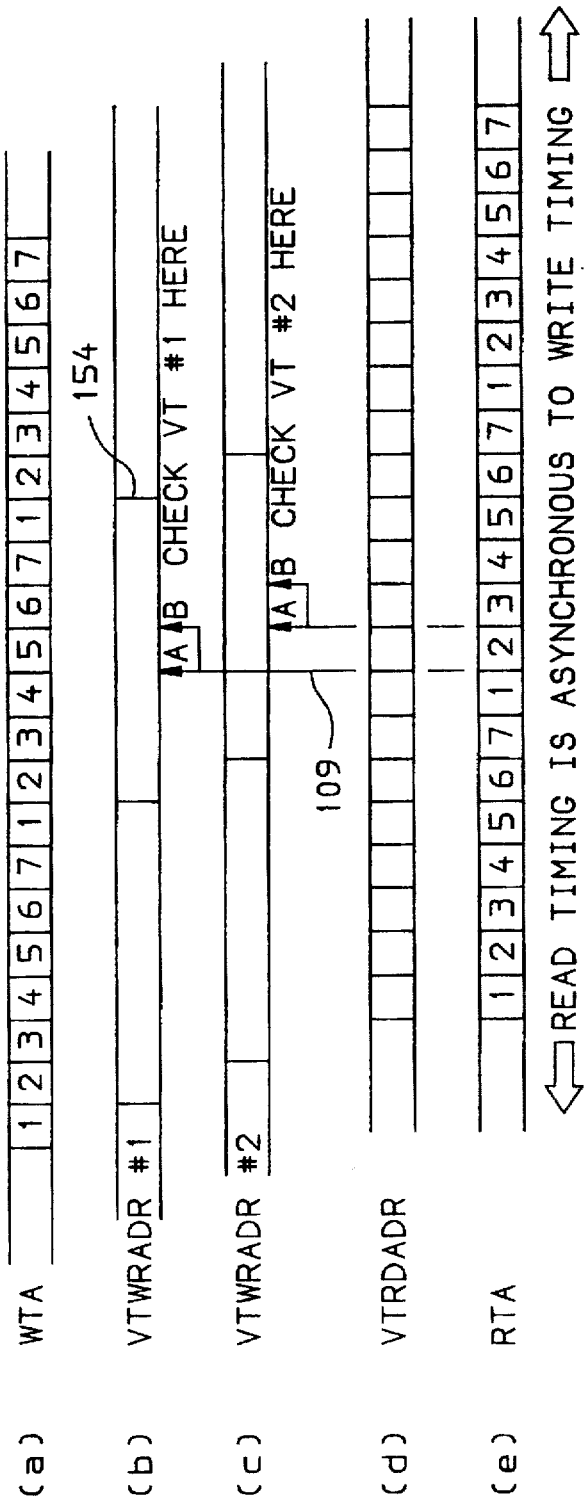
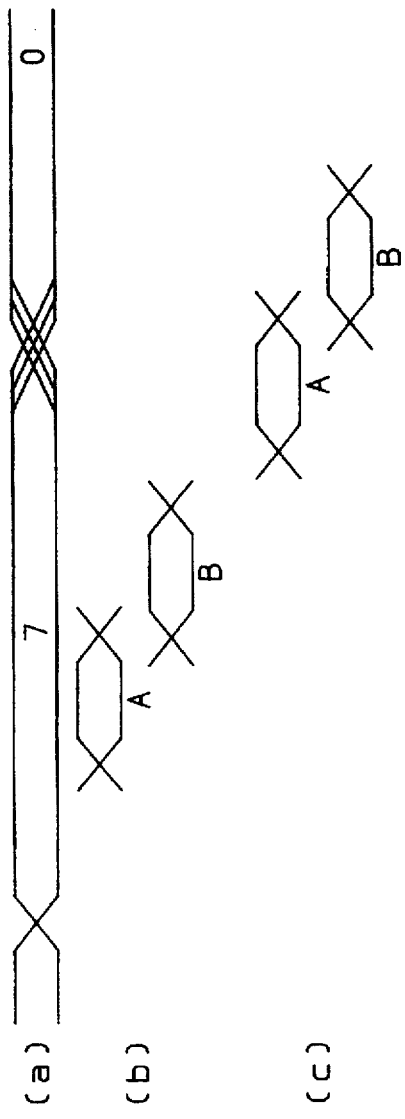
FIG. 2
FIG. 3

SONET TRIBUTARY AMBIGUITY RESOLUTION FOR ELASTIC STORE CONTROL

CROSS-REFERENCE TO RELATED APPLICATIONS

This application discloses subject matter disclosed and claimed in co-owned, copending applications U.S. Ser. Nos. 07/887,156; 07/886,723; 07/886,755; 07/886,724; and 07/886,789, all filed the same day as this application and which are hereby incorporated by reference.

TECHNICAL FIELD

This invention relates to fiberoptic telecommunication transmission systems and, more particularly, to a synchronous optical network (SONET) element.

BACKGROUND OF THE INVENTION

An elastic store function for pre-SONET signals is known as a data buffer that is written into by one clock and read from by another. If long or short-term instabilities exist in either clock, the elastic store absorbs the differences in the amount of data transmitted and the amount of data received. Such an elastic store can compensate only for short-term instabilities that produce a limited difference in the amounts of data transmitted and received. If sustained clock offsets exist, as with highly accurate but unsychronized clocks, an elastic store will eventually overflow or underflow. Ways to insure that overflows do not occur may involve "loop timing," where the line clock on the incoming link of a switch is nominally synchronized to the switch clock where, in essence, the inlets and outlets operate as though directly connected to each other using a common source of timing; and a "regenerative repeater" which establishes transmit timing directly from the locally derived sample clock and the long-term frequency of the transmit clock is controlled by maintaining a certain "average level of storage" in the elastic store.

A SONET Standard is defined by ANSI TI.105-1990, which is hereby incorporated by reference. In SONET systems, on the other hand, within certain constraints regarding the accuracy of the network and network element clocks, the read timing and write timing on opposite sides of an elastic store may be asynchronous. Moreover, by the use of pointers within each frame, a payload may overlap different frames and may move with respect to those frames. Thus, the SONET elastic store presents new opportunities and new problems to solve in control thereof. In particular, we recognized an ambiguity problem in SONET systems in comparing the write and read addresses provided to an elastic store.

DISCLOSURE OF INVENTION

The object of the present invention is to provide a means and method for controlling a SONET tributary elastic store without ambiguity.

According to the present invention, a SONET tributary read or write address is made stable for more than one byte so that it may be compared, respectively, with a write or read address more than once, for the purpose of deciding whether or not an ambiguity exists; if an ambiguity is determined to exist, any pointer adjustment that would otherwise have been made in the absence of an ambiguity, will not be made.

In an embodiment shown herein, the write side, i.e., the line side of a tributary elastic store and store monitor is equipped with separate counters for each tributary so that the address of the particular byte being stored for a particular tributary is available during the time slots associated with other VTs. Each counter provides a hard-wired write address, for the particular byte in the different tributaries being addressed, to a virtual tributary (VT)/tributary unit (TU) elastic store monitor. Only the outputs of one of these counters at a time is actually utilized as a VT write address by the elastic store itself for storing the incoming data. This address selection is done by means of a multiplexer. The VT/TU elastic store monitor, on the other hand, according to the present invention, has all of the VT write addresses available at its inputs for much more than one clock period and thus may be consulted for comparison purposes with the read address more than once in successive bytes.

In further accord with the present invention, the comparison between the write address and the read address is carried out at least twice in order to detect ambiguities in the comparison. In an embodiment shown below, the comparison consists of a subtraction operation performed twice to filter possible "glitches" on the detected signals. In still further accord with the present invention, by providing a write counter that stays stable for a plurality of clock periods, e.g., twenty-eight clock periods for a VT 1.5 structured SPE, the counters on the other side may be designed as a single counter and counts can be stored in a time division multiplexed VT/TU pointer generator state RAM. The first comparison between the read and write counters will not necessarily be reliable because of the phase difference between the line and network element rate clocks and therefore, according to the present invention, filtering is required. Holding the read counter value at least one more byte period and performing another comparison will provide an accurate decision for pointer adjustments.

According to an embodiment of the present invention, for VT 1.5 tributaries, a twenty-eight VT pointer processor shares the same RAM as an elastic store as well as pointer processor circuits as shown in the above-cited copending application U.S. Ser. No. (Attorney Docket 907–120). A near empty or a near full decision is given depending on the position of the elastic store read and write counters. Elastic store RAM is partitioned for a twenty-eight VT payload which requires twenty-eight read and twenty-eight write counters. A novel time division multiplexed pointer processing method allows us to use only one pointer processor circuit for all twenty-eight VTs, excluding elastic store write counters. The read counter is selected to be time shared between twenty-eight VTs. The elastic store control circuit subtracts the write counter value from the read counter value and also latches the read counter outputs which will contain the read addresses of the same VT in the next clock period which could be the next VT. The subtraction is performed one more time to detect a possible difference in the detected signals.

These and other objects, features and advantages of the present invention will become more apparent in light of a detailed description of an embodiment thereof, as illustrated in the accompanying drawing.

BRIEF DESCRIPTION OF THE DRAWING

FIG. 2 shows a method, according to the present invention, for resolving ambiguities which may exist because of the asynchronous relation between elastic store write timing on the line interface side and elastic store read timing on the local side.

FIG. 3 shows a stable write address twice compared, at two different times, to asynchronous read addresses, one without ambiguity and one with.

BEST MODE FOR CARRYING OUT THE INVENTION

Figure 1A:
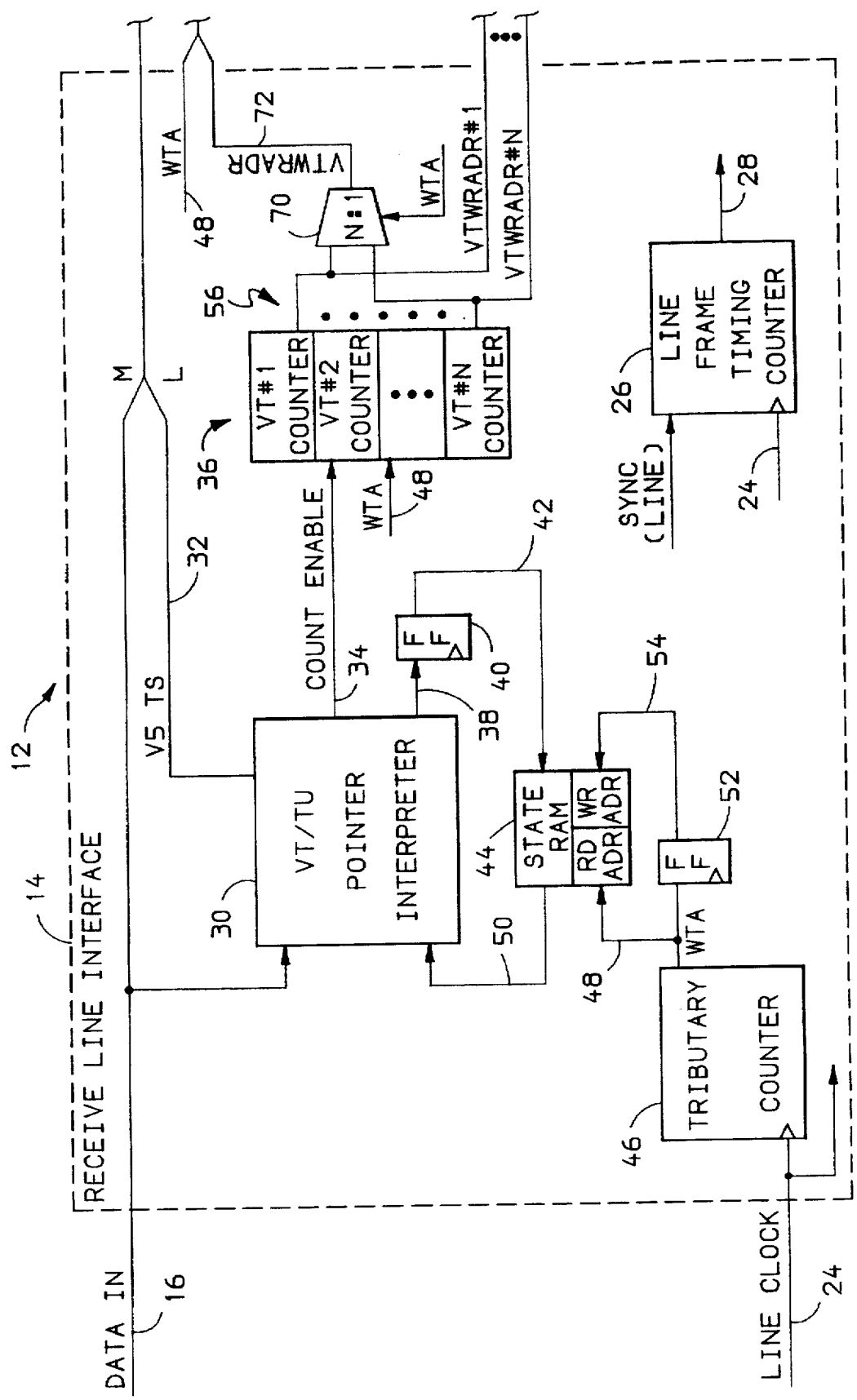
FIG. 1 shows the relation between FIGS. 1(a) and 1(b) which together show a receive section of a SONET network element, according to the present invention, having an elastic store and a store monitor in between a receive line interface running at a line clock rate and a receive local interface running at the same rate by means of a local clock wherein there will typically be a phase difference and slight frequency differences between the line and local clocks.
Figure 1B:
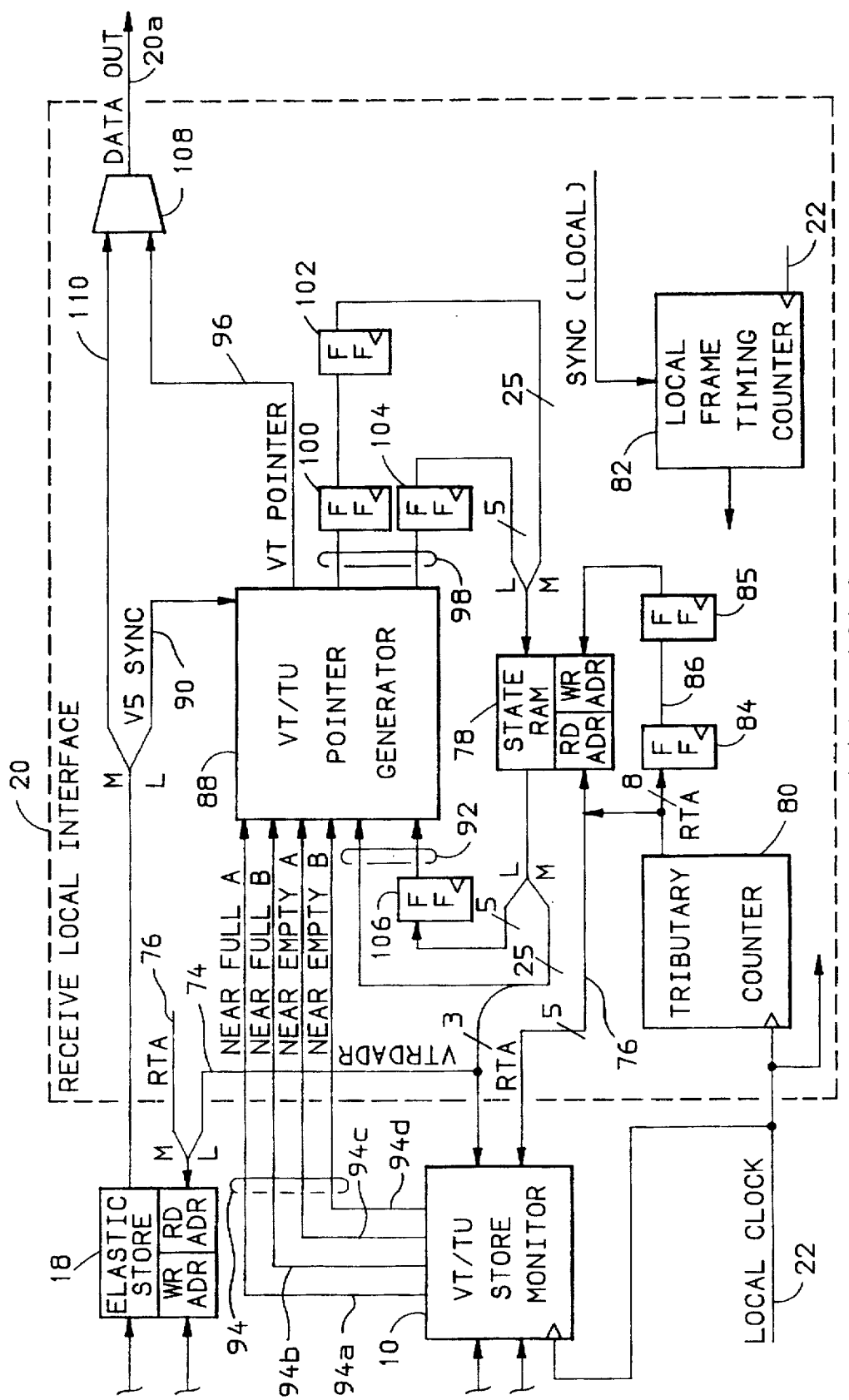

FIGS. 1(a) and 1(b) show a virtual tributary (VT)/tributary unit (TU) elastic store monitor 10, according to the present invention, as part of a receive section 12 of a synchronous optical network (SONET) element also having a receive line interface 14 responsive to incoming serial data on a line 16 for storing such data in an elastic store 18, a receive local interface 20 for reading out such stored data from the elastic store 18 and providing same on a line 20a at a local clock 22 rate as controlled by the monitor 10.

A line rate clock on a line 24 is extracted from the incoming data on the line 16 and used throughout the receive line interface by various synchronous devices including a line frame timing counter 26 responsive to line sync and clock signals for providing a synchronization and timing signal on a line 28 for line side devices within the interface 14. A VT/TU pointer interpreter 30 is responsive to the incoming data on the line 16 for detecting pointers and interpreting same according to the rules set forth in ANSI T1.105-1990 entitled "Digital Hierarchy-Optical Interface Rates and Formats Specifications (SONET)" at section 10.2.7, which is hereby incorporated by reference. The pointer interpreter 30 provides a synchronization signal on a line 32 to the elastic store 18 and a count enable signal on a line 34 to a plurality of VT/TU counters 36. It also provides a VT/TU pointer state signal on a line 38 to a flip-flop 40 where it is stored for one line clock cycle and then provided on a line 42 to a state memory 44, which is a dual-port random access memory (RAM), where it may be stored for a passage of time until the same VT time slots reoccur. Thus, a particular VT will have the last state of its pointer interpretation stored in the state RAM 44 for the period of time required to process other tributaries. A tributary counter 46 provides a write tributary address (WTA) signal on a line 48 to the state RAM 44 for reading previous state data out on a line 50 to the pointer interpreter 30 and also to a flip-flop 52 for delaying the read (WTA) address by one line clock for providing the write address on a line 54 to the state RAM 44 for writing the state information on the line 42 into the state RAM 44.

The write tributary address signal on the line 48 is also used by the multiplexer 70 to output one VT elastic store write address at a time. The VT counters 36 provide a plurality of count signals on lines 56 to the VT/TU store monitor 10. The reason for having a plurality of counters is to be able to provide stable addresses for comparison purposes with the read addresses, on the local side, which go by much more quickly. Thus, referring to FIG. 2(a) it will be observed that the WTA signal which is shown for a VT 6 structure, for example, provides a new VT address seven consecutive clock periods. It should be noted that the frame boundaries are not shown because they have no fixed relation (at least in the VT floating mode) to the beginning of the VT payload. In FIG. 2(b) the elastic store write address for VT number one is shown being held by VT number one counter until the same VT is processed next time in order to provide a stable reference for the VT/TU store monitor, for the purpose of helping in discerning ambiguities. Similarly, in FIG. 2(c) VT write address number two which begins at the beginning of the next VT is held on appropriate lines of the lines 56 until the new byte of the same VT. Therefore, it will be observed from FIG. 2(a), (b) and (c) that even though the write tributary address on the line 48 is being changed every time a new VT begins to be processed, the VT counters 36 will hold a newly addressed VT's address for allowing access for more than one VT period to the VT/TU store monitor 10.

A multiplexer 70 provides a selected VT write address on a line 72 which is combined with the WTA signal on the line 48 in order to properly address the elastic store 18 for storing the incoming data 16 at the proper time according to the V5 sync signal on the line 32.

The stored data and V5 pointer are read out of the elastic store 18 by a VT read address signal on a line 74 as combined with a read tributary address (RTA) signal on a line 76. The VT address signal on the line 74 is provided by a state RAM 78 in response to the RTA signal on the line 76 as provided by a tributary counter 80 as driven by the local clock 22. Local frame timing is provided by a counter 82 in response to the local clock and synchronization (frame and multiframe) signals which provides synchronization and timing for devices of the local interface 20. A pair of flip-flops 84, 85 provide a two clock delay between the RTA provided to the read address function of the state RAM 78 and a write address function as addressed by a delayed read tributary address signal on a line 86.

A VT/TU pointer generator 88 is responsive to a V5 synch signal on a line 90 which is read out of the elastic store 18, and is responsive to a plurality of previous state signals on lines 92 provided by the state RAM 78 and is responsive to a plurality of near full and near empty signals on lines 94 for providing a VT pointer signal on a line 96 and for providing a plurality of next state signals on lines 98 for storage in the state RAM 78. A plurality of flip-flops 100, 102, 104, 106 are placed in the signal path between the VT/TU pointer generator 88 and the state RAM for the purpose of compensating for delays created elsewhere in the circuit.

The incoming data signal on line 16 is thus read into the elastic store 18 at the line clock 24 rate and read out in the receive local interface 20a at the local clock 22 rate. The data on line 20 is from a multiplexer 108 which combines both the pure data on a line 110 read from the elastic store 18 with the VT pointer, with adjustments, on the line 96. The adjustments in the VT pointer on line 96 permit the VT/TUs to "float" with respect to the SONET frame. Referring back to FIG. 2, in FIG. 2(d), the VT read address signal on the line 74 of FIG. 1(b) is shown being provided every time a new VT needs to be read out. The three bits making up this signal do not identify the particular VT. That particular information is provided by the RTA signal as shown in FIG. 2(e). It is noted that a common time line is shared between of FIGS. 2(a)–(e) and therefore it will be observed that the alignment of the VTs, as written into the elastic store, do not always correspond in the same relation to the timing of the read operation of the same VT on the same read side. Thus, read timing is asynchronous to write timing, as indicated in FIG. 2(e), and they may drift in one direction or slide back and forth with respect to one another.

Inasmuch as the write side has been chosen to provide the stable reference address by means of the counters 36, the comparison operation carried out by the elastic store monitor 10 is carried out by reference to the read addresses. Thus, in FIG. 2, the checking of VT number one is done right after the reading of VT number one is completed on the receive local interface 20 side as shown by a comparison line 109 extending between FIGS. 2(b) and 2(e). Since, as shown in FIG. 2(b), the VT write address corresponding to VT write address number one is being stored in the VT number one counter for a lengthy period in counters block 36 on the line side 14, the correspondence between the read address and the write address may be checked more than once (at times A and B). The reason for wanting to check the correspondence between the read address and the write address more than once is that there may be an ambiguity near the boundaries due to the asynchronous relationship between read and write timing. As shown in FIG. 3, if two comparisons of a read address as shown in FIG. 3(b) are done well after and well before the change of the write address of FIG. 3(a), there will be no ambiguity indicated. However, from time to time, a comparison will be done as shown in FIG. 3(c), where the read-write comparison will yield different results. Thus, the present invention first seeks to determine if there is an ambiguity between successive comparisons and, if such ambiguity is detected, then any pointer adjustments which would otherwise have been made are prevented until the ambiguity is resolved. Thus, if the ambiguity persists there will be no further pointer adjustments. If the ambiguity goes away after one or more successive checks, then pointer adjustments may thenceforth be freely made.

In the illustration shown in FIG. 2, the checking is shown taking place in the middle of the counter holding period. However, eventually the checking process will reach a boundary as indicated in FIGS. 3(a) and (c) at which point there may be a difference between the two comparisons of the write and read addresses. Thus, if there is such a difference detected between the two comparisons, then any pointer adjustments that would have otherwise been made will not be made until the difference disappears in future comparisons. Thus, if there is an indication that either of these comparisons do not result in the same difference then no pointer adjustments will be allowed in the pointer generator 88.

Figure 4A:
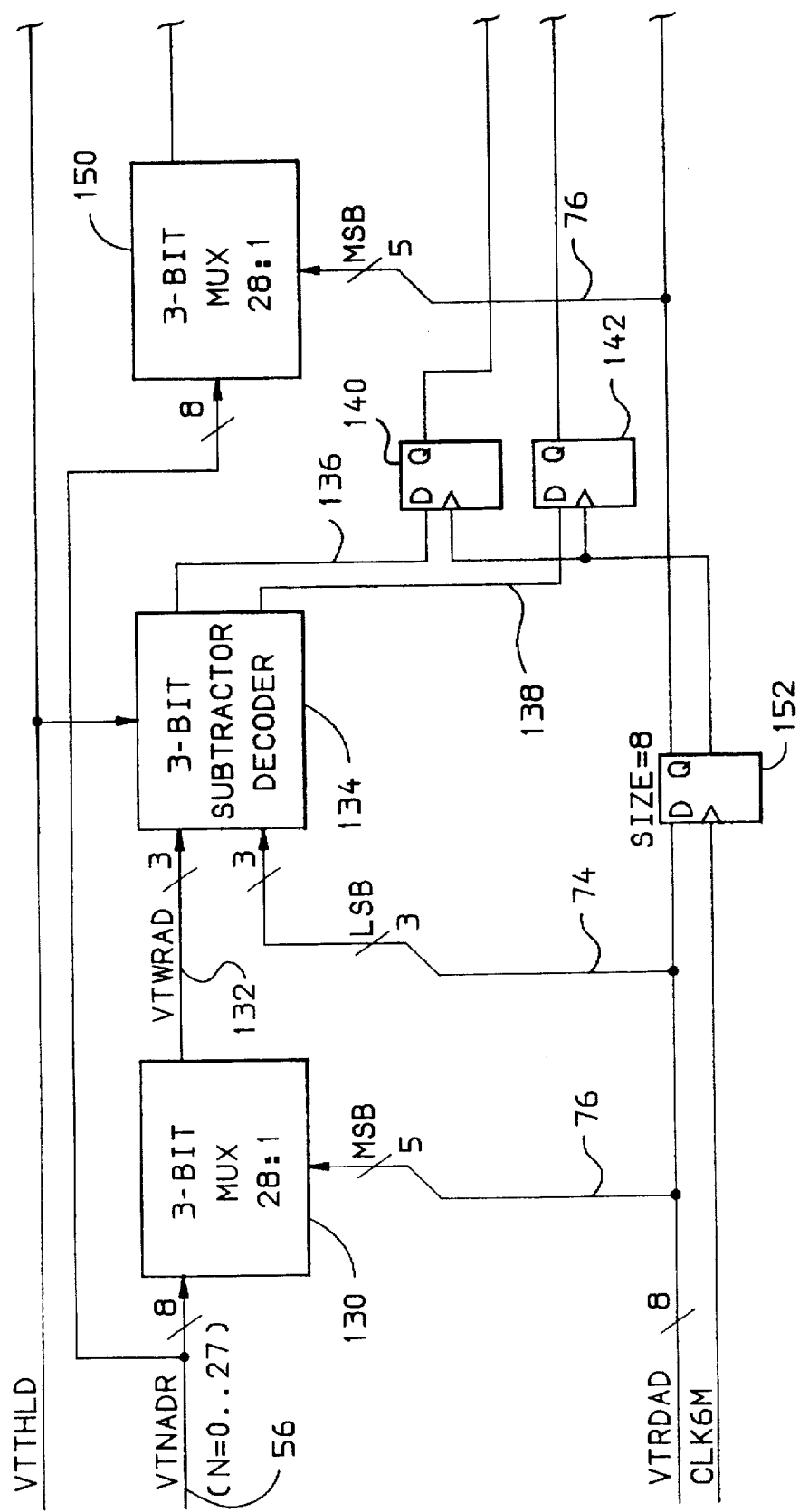
FIG. 4 shows the relation between FIGS. 4(a) and 4(b) which together show a read-write address comparison part of a VT 1.5 elastic store monitor block of FIG. 1 in detail, according to the present invention.

Referring now to FIGS. 4(a) and 4(b), a VT elastic store ambiguity monitoring function is shown, according to the present invention. A 3-bit multiplexer 130 multiplexes twenty-eight VT write counter addresses on the line 56 (see FIG. 1(a) as controlled by the five most significant bits of an eight bit VT read address on the line 76 (see FIG. 1(b). The three bit multiplexer 130 provides a selected VT write address on a line 132 for comparison with the three least significant bits of the VT read address signal on the line 74 (see FIG. 1(b). A three-bit subtractor decoder 134 is responsive to the VT write address signal on the line 132 and the three-bit VT read address on the line 74 for comparing the two according to an algorithm that will produce a near full or near empty signal if the absolute difference becomes greater than a selected limit, depending on the size of the elastic store 18. In the example, the elastic store has eight bytes available for storage purposes and the near full and near empty signals will be provided within two bytes of the limits of the eight byte space. In any event, the three-bit subtractor decoder will either provide no indication of a need for an adjustment, a near full signal on a line 136 or a near empty signal on a line 138. Each of the signals 136, 138 are stored in flip-flops 140, 142, respectively.

Thus, referring back to FIG. 2, the comparison made in the subtractor decoder 134 might be thought of, by way of example, as corresponding to the check indicated by the line 109 of VT number one taking place in FIG. 2(b) at point A after the read address for tributary one is finished. The difference would be two bytes and, although not shown as such in the Figure, it may be assumed for purposes of illustration that the read addresses of FIG. 2(d) are ahead of the write addresses of FIG. 2(b) in time, and the difference will represent a near full condition and therefore the signal on the line 136 will be provided to the flip-flop 140.

At the end of the very next tributary, i.e., tributary two as read on the local interface 20 side, a three bit multiplexer 150 will select the address of tributary number two in the VT counters 36 of FIG. 1(a) as selected by the same signal previously provided in the previous VT to the three bit multiplexer 130. A flip-flop 152 has stored the VT read address on the lines 74, 76 for one VT period. Unless a boundary 154, as shown in FIG. 2(b), has occurred between the A and B readings, there should still be the same difference between the signal on a line 156 and a line 158 to a decoder subtractor 160, as before. Thus, a near full signal on a line 162 will be active indicating a near full condition, as before, and a near empty signal on a line 164 will be inactive. A near full signal on a line 166 will be active, having been previously stored in the flip-flop 140 during the last check. Similarly, a near empty signal on a line 168 will be inactive.

Since the signals on lines 162, 166 are both present, indicating there is no ambiguity between the two subtractions carried out by the subtractors 134, 160, an AND gate 170 will provide a VT near full signal on a line 172. Similarly, if the comparison had indicated a near empty condition for both subtractions, an AND gate 174 would have provided a near empty signal on a line 176. If either of these signals on the lines 172, 176 are present, then no ambiguity exists and any pointer adjustments indicated by the magnitudes thereof are permitted to go forward in the VT/TU pointer generator 88 of FIG. 1(b). The and gates 170, 174 may be located in the elastic store monitor 10 or the VT/TU pointer generator 88. In the actual embodiment that we carried out, the AND gates 170, 174 were outside the actual VT elastic store monitor so we show the lines 94 in FIG. 1(b) before going into the AND gates which may be presumed in this case to be inside the generator 88 in FIG. 1(b).

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A SONET elastic store ambiguity detector, comprising:
   a first comparator (134), responsive to a read address signal (74) and a write address signal (132), for providing a first near full signal (136) and a first near empty signal (138);
   first storage means (140, 142), responsive to the first near full and first near empty signals and to a clock signal, for storing the first near full and first near empty signals for a clock period and for providing a delayed first near full signal (VTNF1) and a delayed first near empty signal (VTNE1) after the clock period;
   second storage means (152), responsive to the clock signal and to the read address signal (74), for storing the read address signal for the clock period and for providing a read address signal (158) after the clock period;

a second comparator (160), responsive to the read address signal (158) provided by the second storage means (152) and to a write address signal (156), for providing a second near full signal (VTNF2) and a second near empty signal (VTNE2);

means (170), responsive to the first near full signal (VTNF1) and the second near full signal (VTNF2), for providing a confirmed near full signal (172) only in the presence of both first and second near full signals (VTNF1, VTNF2); and means (174), responsive to the second near empty signal (VTNE2) and the first near empty signal (VTNE1), for providing a confirmed near empty signal (176) only in the presence of both first and second near empty signals (VTNE1, VTNE2).

2. A SONET pointer processing method, comprising the steps of:

comparing, in two successive steps, a write address with a read address provided for an elastic store, for providing a pointer adjustment enable signal if said comparing steps determine an identical comparison in the two comparing steps and the comparison has a magnitude indicative of a near full or a near empty condition of said elastic store; and allowing a SONET pointer adjustment in the presence of said enable signal.

3. A SONET pointer processing method, comprising the steps of:

comparing, in successive steps, a write address with a read address provided for an elastic store, for failing to provide a pointer adjustment enable signal if said comparing steps determine a disagreement in the comparing steps; and disallowing a SONET pointer adjustment without said enable signal being provided.

* * * * *